(12) United States Patent
Bishop

(10) Patent No.: US 9,357,701 B1
(45) Date of Patent: Jun. 7, 2016

(54) EDGER FOR UTILITY VEHICLE

(71) Applicant: BISHOP ENTERPRISES, INC., Bell Buckle, TN (US)

(72) Inventor: Eldon Bishop, Murfreesboro, TN (US)

(73) Assignee: Bishop Enterprises, Inc., Bell Buckle, TN (US)

( * ) Notice: Subject to any disclaimer, the term of this patent is extended or adjusted under 35 U.S.C. 154(b) by 0 days.

(21) Appl. No.: 14/591,423

(22) Filed: Jan. 7, 2015

(51) Int. Cl.
*A01D 34/84* (2006.01)

(52) U.S. Cl.
CPC ...................................... *A01D 34/84* (2013.01)

(58) Field of Classification Search
CPC ....... A01D 34/84; A01D 43/16; A01B 45/026
USPC ............. 172/14, 424, 426, 425; 56/256, 17.1, 56/16.9
See application file for complete search history.

(56) References Cited

U.S. PATENT DOCUMENTS

| | | | | | |
|---|---|---|---|---|---|
| 2,691,264 | A | * | 10/1954 | Miller | A01G 3/062 56/17.2 |
| 3,079,743 | A | * | 3/1963 | Egley | A01D 34/84 172/15 |
| 3,421,300 | A | * | 1/1969 | Rhodes | A01D 34/63 56/10.8 |
| 3,490,213 | A | * | 1/1970 | Pinto | A01D 34/84 56/16.9 |
| 3,533,223 | A | * | 10/1970 | Gunn | A01G 3/062 172/15 |
| 3,693,334 | A | * | 9/1972 | Lowery | A01D 43/16 56/16.9 |
| 3,743,028 | A | * | 7/1973 | McCloud | A01D 34/84 172/15 |
| D360,639 | S | * | 7/1995 | Strother | D15/17 |
| 5,437,334 | A | * | 8/1995 | Hirata | A01B 33/028 172/125 |
| 6,125,943 | A | * | 10/2000 | Valois | A01D 34/84 172/15 |
| 6,349,488 | B1 | * | 2/2002 | Mason | E02F 3/20 37/189 |
| 2005/0193700 | A1 | * | 9/2005 | Bares | A01D 34/82 56/12.7 |
| 2008/0216459 | A1 | * | 9/2008 | Spitzley | A01D 34/84 56/12.7 |
| 2013/0152537 | A1 | * | 6/2013 | Cathcart | A01D 34/824 56/12.7 |
| 2014/0026530 | A1 | * | 1/2014 | Cathcart | A01D 34/416 56/12.7 |
| 2015/0039269 | A1 | * | 2/2015 | Mejegard | G06Q 10/06 702/182 |

* cited by examiner

*Primary Examiner* — Robert Pezzuto
*Assistant Examiner* — Jessica H Lutz
(74) *Attorney, Agent, or Firm* — Mark Malek; Stephen Bullock; Widerman Malek, PL

(57) ABSTRACT

An edging system includes a mounting bracket adapted to be mounted to a portion of a vehicle, the mounting bracket having a control arm receiving member, a control arm rotatably connected to the control arm receiving member so that the control arm is rotatably connected to the mounting bracket, a control arm moving device connected to the mounting bracket, the control arm moving device having an end portion adapted to engage a portion of the control arm, and an edger assembly connected to an end portion of the control arm. The edger assembly can include a frame assembly connected to the end portion of the control arm, and a cutting member carded by the frame assembly. The activated position of the edger assembly may be defined as the edger assembly being positioned so that the cutting member engages a portion of the ground adjacent to the edger.

20 Claims, 8 Drawing Sheets

EDGER FOR UTILITY VEHICLE

FIELD OF THE INVENTION

The present invention relates to systems and methods for cutting sod, grass, and other such materials. In particular, the invention relates to a device for cutting sod and grass away from the edge of a sidewalk, pathway, roadway, or other structure.

BACKGROUND

Edging is a task that requires a great deal of time and labor to give a landscaped area a professional "finished" look. Commercial and industrial maintenance organizations are constantly trying to find ways to reduce the amount of time and labor involved in "finishing" an edge along a pathway or border.

The accepted way of edging is currently done using a stick edger, a string edger, or a small motorized edger and requires a tremendous amount of labor and time. Handheld edgers are slow, labor intensive and can be extremely dangerous to pedestrians due to the edger throwing objects during operation. Therefore, users with a large area to edge are looking for a more efficient, safer, and less time consuming way to edge. Some examples of large areas to edge include colleges, hospitals, large apartment complexes, condominiums, and roadsides.

Early attempts at utilizing an edger on a vehicle were unsuccessful. For instance, in one attempt, an edger was installed between the rear wheel and the two front drive wheels of a mower. This design had an issue picking up the rear wheel and not allowing enough weight to be transferred to the cutting disc.

In another example, a company, after discussing possible edger designs with the inventor, attached an edger to the side of a mowing deck and used a linear actuator (which is basically a mechanical screw) for down pressure. The available weight off of the side of this deck was only about 175 pounds. This design also was not effective.

US Patent Application Publication No. US 2009/0260841 describes an edger that is attached to the bed of a trickster type vehicle.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an edging system designed to allow superior force to be applied to a coulter.

An exemplary aspect of the invention is directed toward an edging system including a mounting bracket adapted to be mounted to a portion of a vehicle. The mounting bracket may have a control arm receiving member. The edging system may also include a control arm rotatably connected to the control arm receiving member so that the control arm is rotatably connected to the mounting bracket. The edging system may further a control arm moving device connected to the mounting bracket. The control arm moving device may have an end portion adapted to engage a portion of the control arm. The edging system may also include an edger assembly connected to an end portion of the control arm.

The edger assembly may be movable between an activated position and a deactivated position. The edger assembly can include a frame assembly connected to the end portion of the control arm, and a cutting member carried by the frame assembly. The activated position of the edger assembly may be defined as the edger assembly being positioned so that the cutting member engages a portion of the ground adjacent to the edger. The deactivated position of the edger assembly may be defined as the edger assembly being positioned so that the cutting member is spaced apart from the ground adjacent to the edger during normal operation.

Normal operation may include instances when the engagement location of the coulter and the ground is at or below the wheel elevation of the vehicle on continuous, substantially flat, surfaces. The control arm moving device may include a hydraulic piston device. The control arm moving device may also include an electric motor configured to drive the hydraulic piston device. The hydraulic piston device may include a hydraulic piston. The electric motor and hydraulic piston device may be formed as a self contained device.

The activated position of the edger may be further defined as the edger assembly being positioned so as to contact the ground during normal operation. The control arm may include a flange that is connected to the hydraulic piston such that the hydraulic piston causes a rotation of the flange and the control arm. The flange may also include a notch adapted so as to communicate with the mounting bracket so as to lock the control arm into position. A shape of the control arm may be configured such that the edger is positioned forward of where a user operates the vehicle.

The edger assembly may also include a spring connected to the edger assembly and the end portion of the control arm. In some embodiments, the frame assembly may be connected to the spring. The spring may be adapted so as to bias the edger assembly to a neutral position.

In addition, the control arm moving device may be configured so as to be electrically coupled to an electric power source of the vehicle.

DETAILED DESCRIPTION OF THE INVENTION

Figure 1:
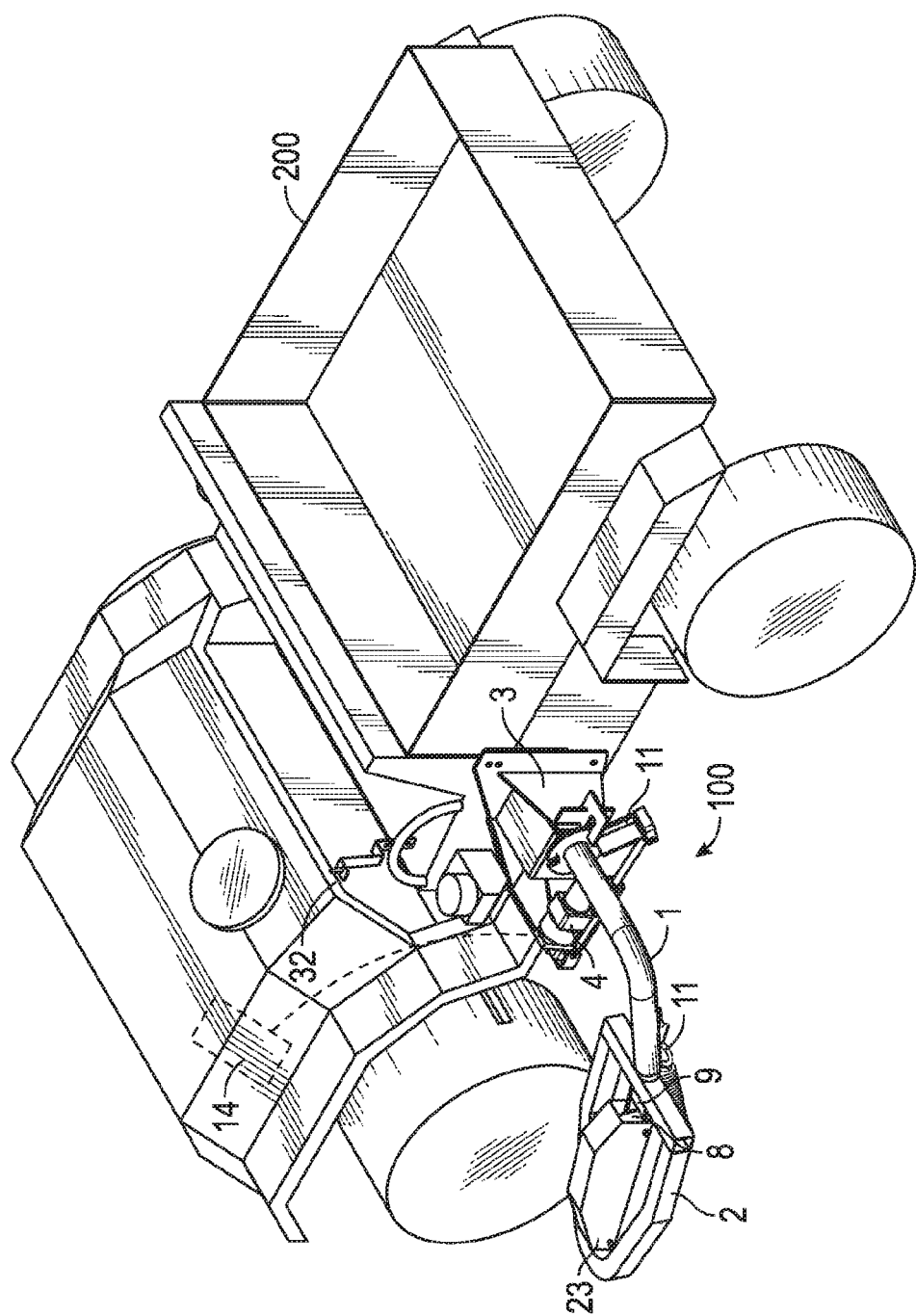
FIG. 1 is a perspective view of an edging system attached to a vehicle according to an embodiment of the present invention.
Figure 2:
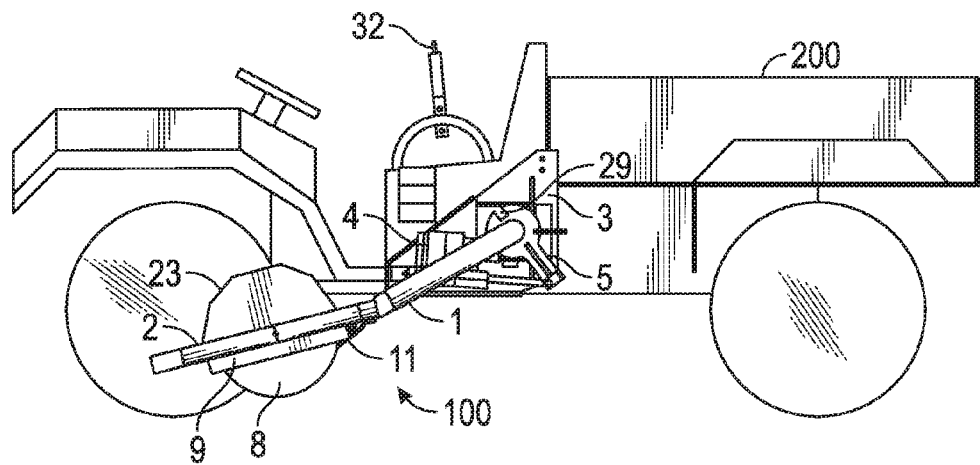
FIG. 2 is side view of the edging system attached to the vehicle according of FIG. 1.
Figure 3:
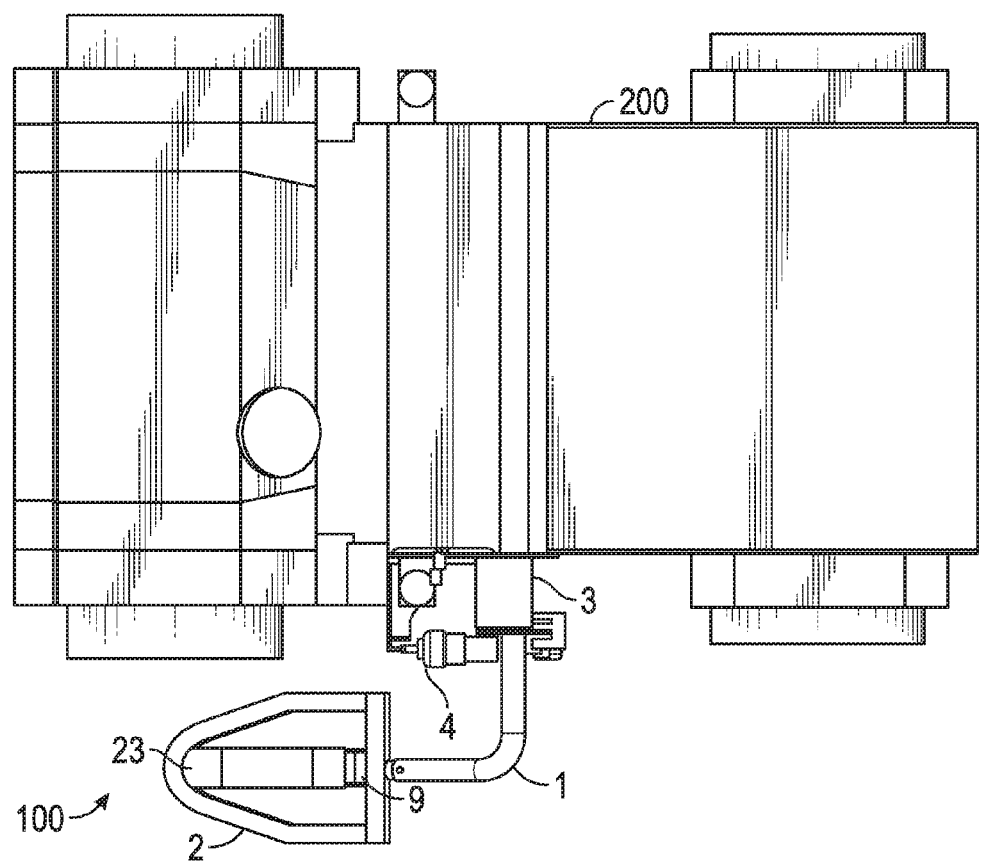
FIG. 3 is top view of the edging system attached to the vehicle according of FIG. 1.
Figure 4:
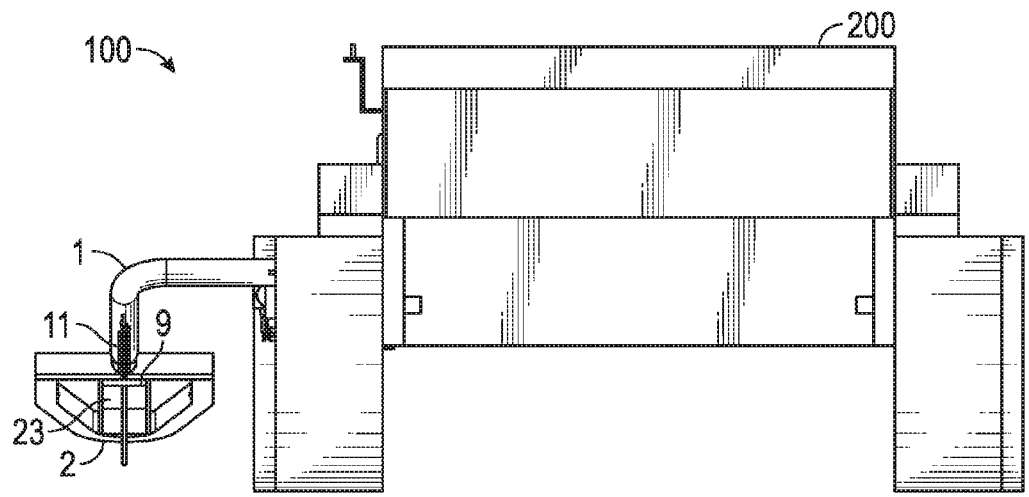
FIG. 4 is back view of the edging system attached to the vehicle according of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An exemplary embodiment of the invention, as shown and described by the various figures and accompanying text, provides an edging system having an enhanced pressure application system.

FIGS. 1-4 illustrate an exemplary embodiment of the edging system 100 attached to the vehicle 200. In some embodiments, the vehicle 200 may include a utility vehicle, mower, or any other self propelled platform. The vehicle 200 may also include platforms on which a user does not ride, but on which edging system 100 is carried, such as a pushed platform or a self propelled platform. These systems may be similar to a push lawnmower or a self propelled lawn mower. The vehicle 200 will preferably have a power supply 14 or power transmission device to provide power (e.g., electrical, hydraulic, etc.) to the edging system 100.

An exemplary embodiment of the edging system 100 may include a control arm 1, an edger assembly 2, a mounting bracket 3, and a control arm moving device, which will be referred to as a driver 4. One end of the control arm 1 may be rotatably connected to the mounting bracket 3 and another end of the control arm 1 may be connected to the edger assembly 2. The control arm 1 may include a connecting device, such as flange 5, to connect the control arm 1 to the driver 4. The flange 5 may include a groove 29 to allow the control arm 1 to be installed and removed from the mounting bracket 3, as will be described further below.

Figure 7:
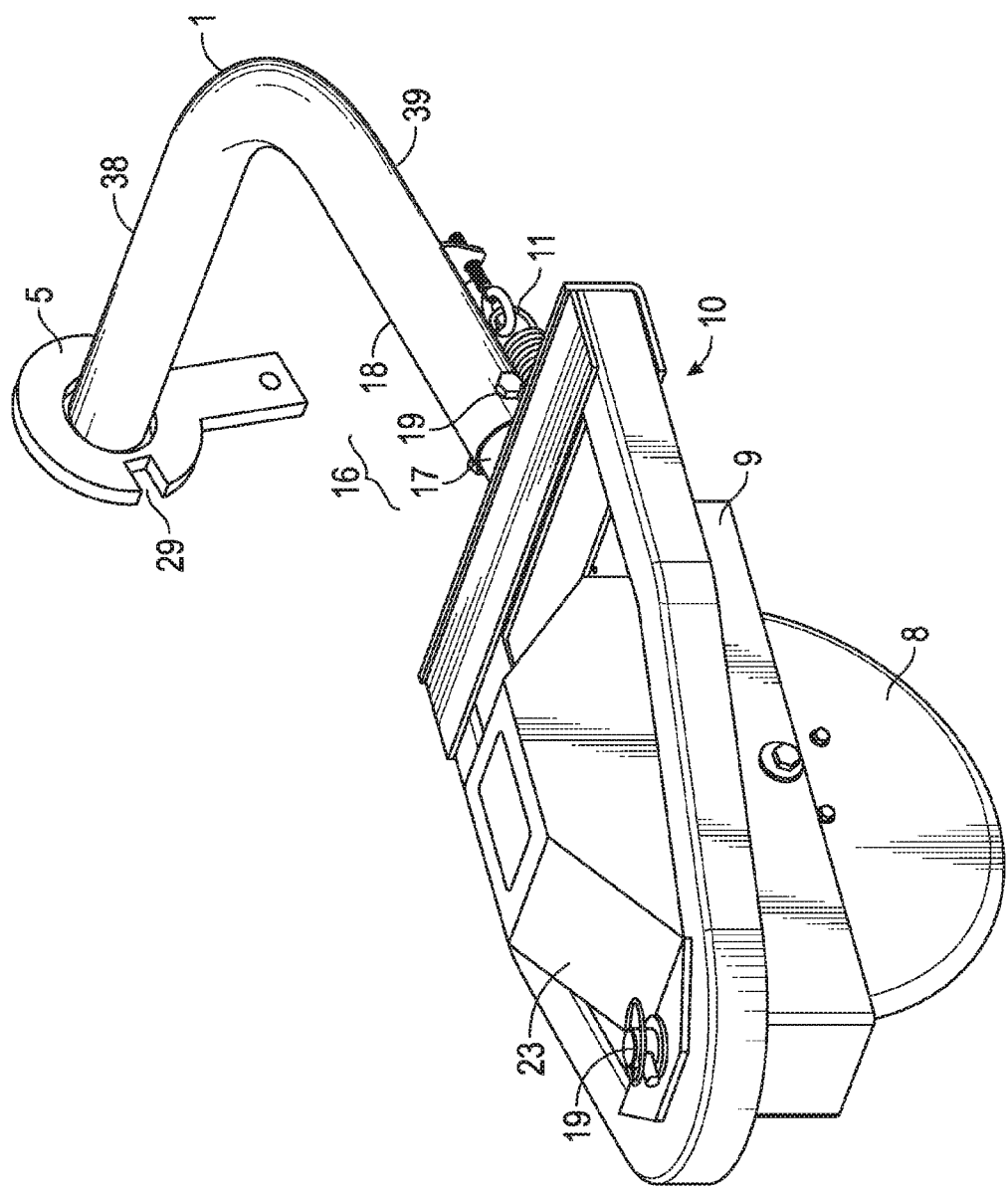
FIG. 7 is perspective view of the control arm and the edging device of an edging system according to FIG. 5.
Figure 8:
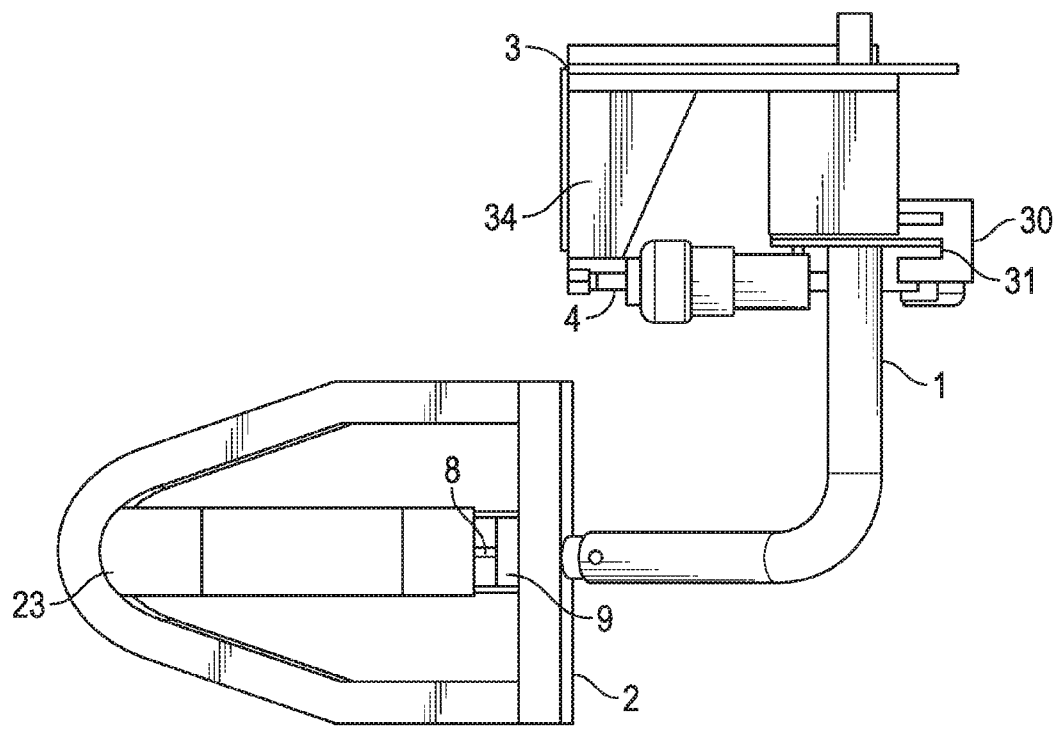
FIG. 8 is top view of the edging system according to FIG. 5.
Figure 9:
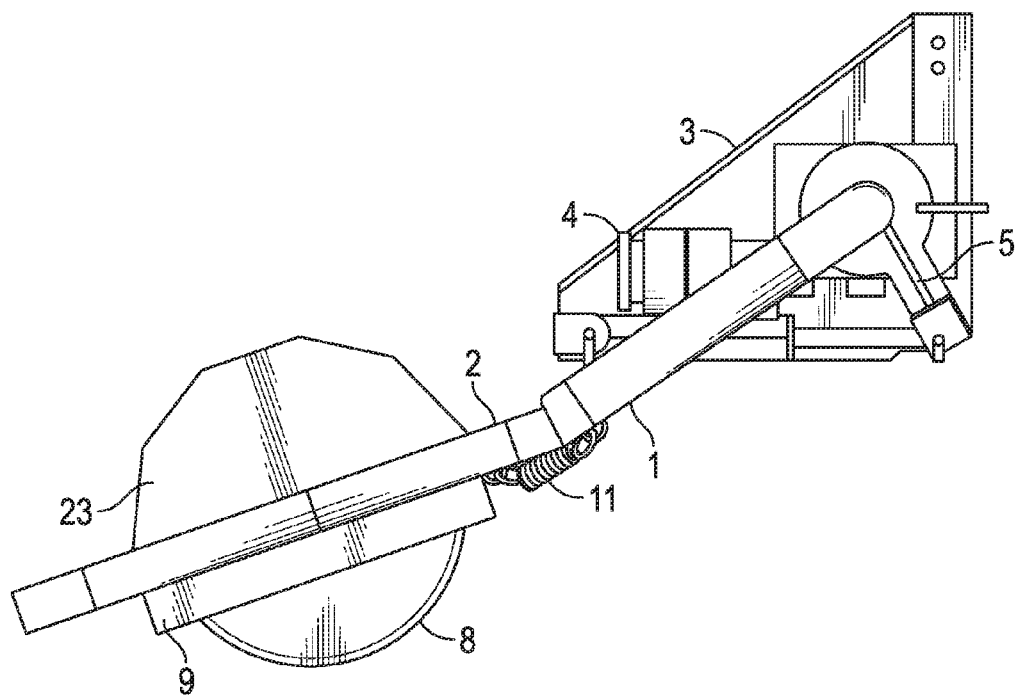
FIG. 9 is a side view of the edging system according to FIG. 5.

As illustrated in FIG. 7, in some embodiments, the control arm 1 may have a first portion 38 extending outward from the mounting bracket 4 away from the vehicle 200 in a first direction, and a second portion 39, connected to an end of the first portion 38 opposite the mounting bracket 3, and extending from the first portion 38 in a direction substantially perpendicular to the first direction. The control arm 1, the mounting bracket 3 and the driver 4 may be configured so as to move the control arm 1 from a deactivated position where the edger assembly 2 may not engage with the ground (e.g., where the first portion is parallel or pointed upward from the ground) to an activated position where the edger assembly 2 may engage with the ground. The position of the control arm 1 may be controlled by actuation of the driver 4.

The mounting bracket 3 may include a side plate 15 having a control arm receiver 28 which is configured to connect to the control arm 1. The mounting bracket 3 may also include a fastening portion 6, which may be used to connect the mounting bracket 3 to vehicle 200. The mounting bracket 3 may also include a driver connector which connects to the driver 4 so as to allow the driver 4 to effect relative motion between the control arm 1 and the mounting bracket 3. The method of connecting the driver 4 to the mounting bracket is not particularly limited. For instance, the driver connector may include a peg 33 with which the driver 4 engages and a support member 34 on which the driver 4 may be further secured (e.g., bolted to, rest against, etc.) to provide structural support.

In addition, the mounting bracket 3 may include a keeper 30. The keeper 30 may extend from side plate 15 and include a notched wall 31 in which flange 5 fits when the control arm 1 is attached to the mounting bracket 3. The control arm 1 may be rotated such that the groove 29 aligns with the notched wall 31 so as to allow the control arm 1 to be attached and/or removed from the mounting bracket 3. When the groove 29 and the notched wall 31 are not aligned, the flange 5 keeps the control arm 1 from being removed from the mounting bracket. In some embodiments, the groove 29 will not align with the notched wall 31 during normal operation of the driver 4. In addition, during removal and attachment of the control arm 1, the driver 4 can be disconnected from the control arm 1 so that the control arm 1 can be removed from the vehicle 200.

In some embodiments, the mounting bracket 3 may have multiple bends to strengthen the bracket against loads in different directions. For instance, as a non-limiting example, the mounting bracket 3 may be formed of a ¼ thick material such as steel. The control arm receiver 28 may include a 2¼ tube extending from side plate 15. The control arm 1 may include a hollow tube which can be slid over the control arm receiver 28 tube.

The mounting bracket 3 may also be connected to a center of gravity of the vehicle 200. By so doing, the vehicle 200 can apply a greater portion of its weight in resistance to the force of the driver 4. In some embodiments, it may be beneficial to connect the mounting bracket 3 to the frame of the vehicle 200, or to some other strong load bearing area.

The edger assembly 2 may be connected to an end portion of the control arm 1 which is not adjacent to the vehicle 200. The edger assembly 2 may include a cutting device such as a cutting disk, coulter disk, blade, etc., which will be referred to as a coulter 8. For instance, the coulter 8 may be a disk having a concave shape and a sharp edge. The coulter 8 may be housed in a coulter carrying frame 9. The coulter carrying frame 9 may be attached to a main frame 10, and the main frame 10 may be connected to the control arm 1.

In some embodiments, an elastic member or biasing member, such as a spring 11, may the connect control arm 1 to the coulter carrying frame 9. For instance, a side of the coulter carrying frame 9 opposite the control arm 1 may be moveably connected to the main frame 10 and the other side of the coulter carrying frame 9 (e.g., the side of the coulter carrying frame 9 adjacent to the control arm 1) can be connected to the spring 11. This can allow the spring 11 to bias the coulter carrier frame 9 toward a home or center position.

The use of the spring 11 may allow the coulter carrier frame 9, and therefore the coulter 8, to follow the edge of a roadway or other surface, for instance through a biasing pressure on the coulter 8 caused by contact with the surface, and then go back to the center position so as to cut parallel to a traveling direction of the vehicle 200. This may allow the edging system 100, and the coulter 8 in particular, to follow and adjust to curves in a roadway, sidewalk, etc., so that the coulter 8 is able to edge next to and follow an irregular or curved surface. For example, a circular sidewalk or a sidewalk with other curves may be closely edged due to the coulter carrying frame 9 being able to turn so as to allow the coulter 8 to follow the edge of the sidewalk.

Figure 5:
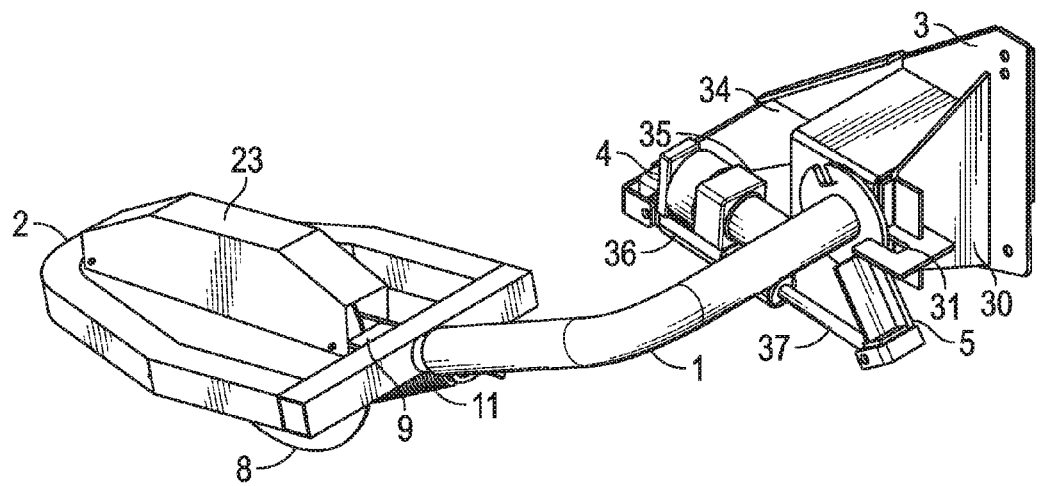
FIG. 5 is perspective view of an edging system according to an embodiment of the present invention.
Figure 6:
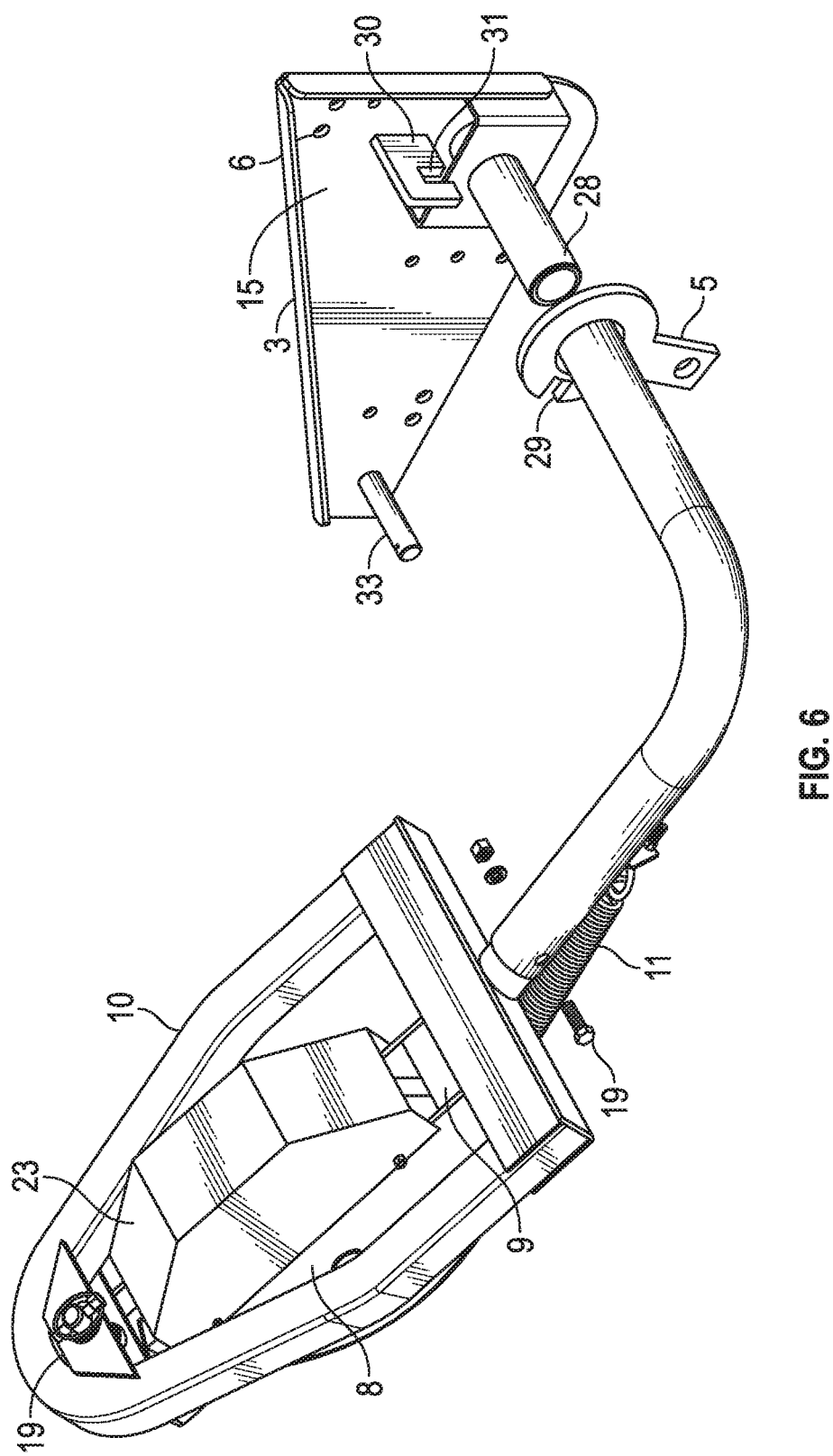
FIG. 6 is perspective view of a partially assembled edging system according to FIG. 5.

As illustrated in FIG. 5, the driver 4 may be connected to the control arm through the flange 5. The method of connection and location of connection of the driver 4 to the flange 5 is not particularly limited. For instance, the driver 4 may be mounted on the mounting bracket 3 and be connected to an end portion of the flange 5 opposite the control arm 1 and may increase the moment force generated to rotate the control arm 1. It is also possible for the driver 4 to connect directly to the control arm 1 so as to apply a rotational force directly to the control arm 1.

The method of powering the driver 4 is not particularly limited. For instance, the driver 4 may be hydraulic, pneumatic, electric, or any combination thereof. As illustrated in FIG. 5, the driver 4 may be a self contained electric over hydraulic cylinder. This type of cylinder is sometimes used in maritime applications. In such a system, the driver 4 may include a pump motor and pump 35, and a cylinder 36. The pump motor and pump 35 may be electrically driven. The cylinder 36 may include a piston 37 which can attach to flange 5. The pump motor and pump 35 can drive the piston 37. An end portion of the piston 37 can be moveably attached to flange 5 through the use of a ball joint, bearing, bushing, etc.

The driver 4 may be powered using electrical power provided by the vehicle 200, from the power source 14. The power source 14 may include a battery, alternator, or any other suitable power supply. The power source 14 may be connected to the driver 4 with a connector 40. This may allow the driver 4 to be compact and easily installed on existing vehicles. Optionally, in some embodiments, the driver 4 may include a hydraulic cylinder which receives power from a separate hydraulic pump motor system.

The use of electric over hydraulic power for the driver 4 may also greatly increase the force available for pressing down the coulter 8 compared with existing techniques. This is useful as the inventors have determined that it takes a minimum of 400 to 600 pounds of pressure to force the coulter 8 far enough into the ground to be effective the first time edging is done. Previous edging devices used in the industry merely use a linear actuator which provides only about 175 pounds of down pressure to a coulter. The use of an electric over hydraulic system for the driver 4 enables the use of a cylinder capable of generating an output of 10,000 lbs. of thrust in order to provide appropriate down pressure to the coulter 8. In general, this may allow edging speeds of 5 miles per hour, or greater, which is much faster than any currently available system.

The edging system 100 may be controlled with a control switch 32 which may be mounted, for instance, on the left arm rest of the vehicle 200, or any other desired location. The control switch 32 may be connected to the driver 4 and the power supply 14 of the vehicle 200 as appropriate. In some embodiments, the control switch 32 may include a multiple position switch which regulates the actuation of the driver 4, and thus the position of the coulter 8. The control switch 32 and the driver 4 may be configured so that each position sets a particular height of the coulter 8 and/or may allow for continuous adjustment of the height of the coulter 8.

For instance, the control switch 32 may be a three-position switch with a 12 volt battery as the power source 14. The control switch 32 connects the driver 4 to the battery so as to allow a bi-directional rotation of the pump motor. One direction (e.g., clockwise) makes the coulter 8 go downward and the other direction makes the coulter 8 go upward.

Figure 10:
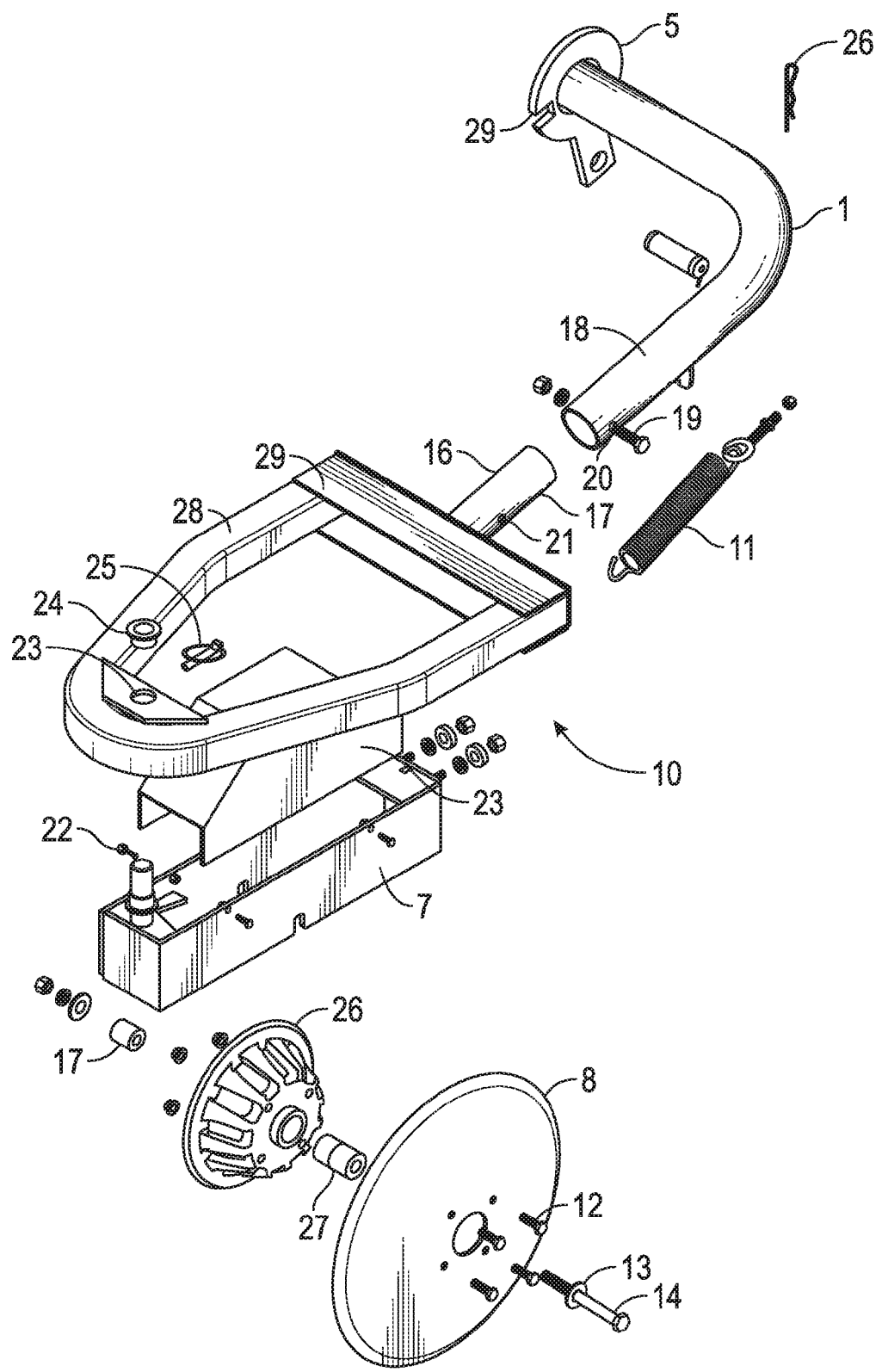
FIG. 10 is an exploded view of the edging system according to FIG. 5.
Figure 11:
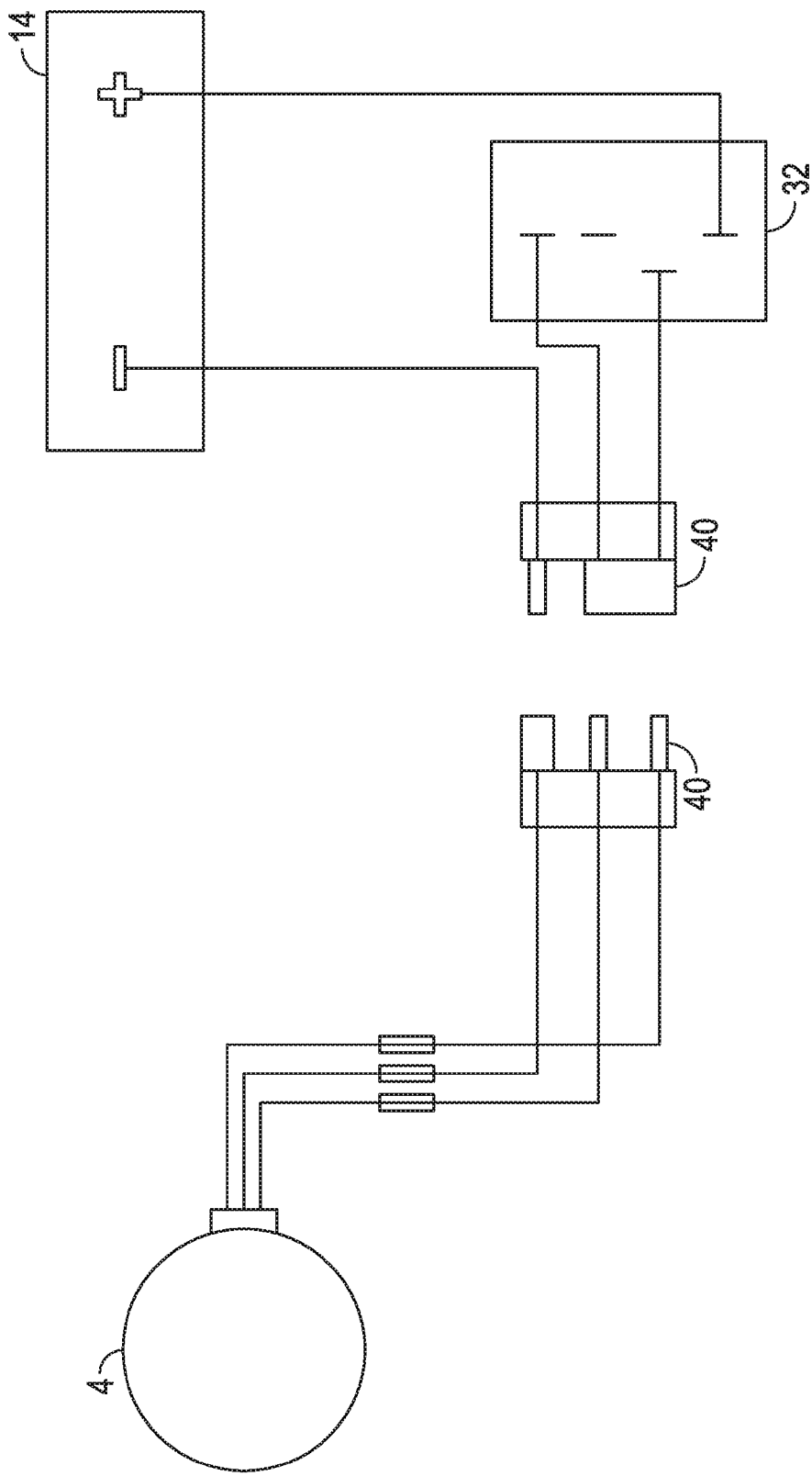
FIG. 11 is an electrical schematic of an exemplary embodiment of the edging system attached to a power source.

FIG. 10 is an exploded view of an exemplary embodiment of the invention. As can be seen, the main frame 10 is formed such that the opening in which the coulter carrying frame 9 moves becomes wider as the coulter carrying frame 9 extends toward the control arm 1. This may allow a greater range of horizontal motion for the coulter carrying frame 9 to turn/pivot so that curves having a high angle can be followed by the coulter 8. The main frame 10 may extend around the coulter carrier frame 9 in a closed loop for added structural support. For instance the main frame 10 may include a first member 28, formed in a U-shape, connected to a second member 29 at both end portions of the first member 28. This shape may also allow the amount of rotation of the coulter carrying frame 10 to be limited to a desired range.

The main frame 10 may include a control arm connector 16 which can fixedly attach the main frame 10 to the control arm 1 so as to restrict relative movement between the two members. The structure of the control arm connector 16 is not particularly limited and may include a connecting shaft 17 which can mate with a receiving tube 18 on control arm 1. The two members can be fixed in place through, for example, the use of a pin 19 fitted through holes 20 and 21, or any other appropriate method such as a threaded connection, latch, etc.

The coulter carrying frame 9 may also include a coulter carrying frame connector 19 to allow the coulter carrying frame 9 to be pivotally attached to the main frame 10. The method of connecting the coulter carrying frame 9 to the main frame 10 is not particularly limited. For instance, the coulter carrying frame 9 may include a lynch pin 22 which can extend through a hole 23 in the main frame 10. The hole 23 may include a bearing or bushing 24. The lynch pin 22 may then be secured by any applicable method, such as a pin or bolt 25 fixed to lynch pin 22.

The coulter carrying frame 9 may include a coulter guard 23 connecting to the coulter frame main body 7 so as to cover an upper portion of coulter 8. The coulter 8 may be connected to the coulter frame main body 7 through a coulter hub 26. A bearing or bushing 27 may be disposed between the coulter hub 26 and the coulter 8 to promote smooth rotation of the coulter 8.

A description of an exemplary method of operation will now be discussed. During operation, the user can activate the control switch 32 so as to provide power to the driver 4. When power is supplied to the driver 4, the pump motor 35 activates and drives the cylinder 36 so as to cause rotation of the control arm 1. The rotation of the control arm 1 drives the coulter 8 into the ground. The user may then edge as desired. When the coulter 8 encounters a curve in the pathway, the pivotable coulter carrying frame 9 allows the coulter 8 to follow the curve in the pathway. When the pathway straightens, the spring 11 may bias the coulter carrying frame 9 back to the centered position to allow the coulter 8 to follow the straight away. When edging is finished the user can use the control switch 32 so as to cause the driver 4 to actuate and rotate the control arm 1 to raise the coulter 8 from the ground.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. An edging system comprising:
   a mounting bracket adapted to be mounted to a portion of a vehicle, the mounting bracket including a control arm receiving member;
   a control arm rotatably connected to the control arm receiving member, wherein the control arm further comprises:
      a first portion extending from the mounting bracket away from the vehicle in a first direction, and
      a second portion extending in a direction substantially perpendicular to the first direction,
   wherein the control arm is rotatably connected to the mounting bracket;
   a control arm moving device connected to the mounting bracket, the control arm moving device having an end portion adapted to engage a portion of the control arm;
   an edger assembly connected to an end portion of the control arm, wherein the edger assembly is movable between an activated position and a deactivated position and wherein the edger assembly comprises:
      a frame assembly connected to the end portion of the control arm,
      a cutting member carried by the frame assembly, wherein the frame assembly extends around the cutting member in a closed loop;
   wherein the activated position of the edger assembly is defined as the edger assembly being positioned so that the cutting member engages a portion of the ground adjacent to the edger during normal operation; and
   wherein the deactivated position of the edger assembly is defined as the edger assembly being positioned so that the cutting member is spaced apart from the ground adjacent to the edger during normal operation.

2. The system according to claim 1 wherein the control arm moving device includes a hydraulic piston device.

3. The system according to claim 2 wherein the control arm moving device further comprises an electric motor configured to drive the hydraulic piston device.

4. The system according to claim 2 wherein the electric motor and the hydraulic piston device comprise a self contained device.

5. The system according to claim 4 wherein the hydraulic piston device includes a hydraulic piston, and
   wherein the control arm comprises a flange that is connected to the hydraulic piston.

6. The system according to claim 5 wherein movement of the hydraulic piston causes rotation of the flange and the control arm.

7. The system according to claim 5 wherein the flange includes a groove adapted so as to communicate with a notched wall of a keeper located on the mounting bracket so as to lock the control arm into a position.

8. The system according to claim 1 wherein the frame assembly further comprises:
   a connecting shaft configured to mates with a receiving tube; and
   a first hole disposed in a connecting shaft adapted to align with a second hole disposed in a receiving tube.

9. The system according to claim 1 further comprising a spring connected to the edger assembly and the end portion of the control arm.

10. The system according to claim 9 wherein the frame assembly is connected to the spring.

11. The system according to claim 9 wherein the spring is adapted so as to bias the edger assembly to a neutral position.

12. The system according to claim 1 wherein the control arm moving device is configured so as to be electrically coupled to an electric power supply of the vehicle.

13. An edging system comprising:
   a vehicle; and
   an edger comprising:
      a control arm with a first portion extending outward from the mounting bracket away from the vehicle in a first direction and a second portion extending in a direction substantially perpendicular to the first direction;
      a mounting bracket adapted to be mounted to a portion of the vehicle, the mounting bracket further comprising:
      a control arm receiving member,
         a side plate having a control arm receiver configured to connect to the control arm, and
         a driver connected by a driver connector configured to effect relative motion between the control arm and the mounting bracket
      wherein the control arm is rotatably connected to the control arm receiving member so that the control arm is rotatably connected to the mounting bracket;
      a control arm moving device connected to the mounting bracket, the control arm moving device having an end portion adapted to engage a portion of the control arm;
      an edger assembly connected to an end portion of the control arm, wherein the edger assembly is movable between an activated position and a deactivated position and wherein the edger assembly comprises:
         a cutting member, and a frame assembly connected to the end portion of the control arm and adapted to carry the cutting member and to extend around the cutting member in a closed loop, wherein the activated position of the edger assembly is defined as the edger assembly being positioned so that the cutting member engages a portion of the ground adjacent to the edger during normal operation; and wherein the deactivated position of the edger assembly is defined as the edger assembly being positioned so that the cutting member is spaced apart from the ground adjacent to the edger during normal operation.

14. The system according to claim 13 wherein the control arm moving device further comprises:
   a hydraulic piston device, and
   an electric motor configured so as to drive the hydraulic piston device.

15. The system according to claim 13 wherein the control arm moving device is configured so as to be electrically coupled to an electric power of the vehicle.

16. The system according to claim 13 further comprising a spring connected to the edger assembly and the end portion of the control arm,
   wherein the frame assembly is connected to the spring, and
   wherein the spring is adapted so as to bias the edger assembly to a neutral position.

17. The system according to claim 13 wherein the control arm comprises a flange that is connected to the control arm moving device.

18. The system according to claim 14 wherein the electric motor and the hydraulic piston device comprise a self contained device.

19. The system according to claim 13 wherein movement of the control arm moving device causes rotation of the flange and the control arm.

20. An edging system comprising:
   a mounting bracket adapted to be mounted to a portion of a vehicle, the mounting bracket including a control arm receiving member;
   a control arm with a first portion extending outwardly from the mounting bracket away from the vehicle in a first direction and a second portion extending in a direction substantially perpendicular to the first direction;
   wherein the control arm is rotatably connected to the control arm receiving member so that the control arm is rotatably connected to the mounting bracket;
   a control arm moving device connected to the mounting bracket, the control arm moving device having an end portion adapted to engage a portion of the control arm; and
   an edger assembly connected to an end portion of the control arm, wherein the edger assembly is movable between an activated position and a deactivated position and wherein the edger assembly comprises:
      a cutting member, and
      a frame assembly connected to the end portion of the control arm and adapted to extend around the cutting member in a closed loop;
      wherein the cutting member is carried by the frame assembly;
   wherein the activated position of the edger assembly is defined as the edger assembly being positioned so that the cutting member engages a portion of the ground adjacent to the edger during normal operation;
   wherein the deactivated position of the edger assembly is defined as the edger assembly being positioned so that the cutting member is spaced apart from the ground adjacent to the edger during normal operation;
   wherein the control arm moving device includes a hydraulic piston device;
   wherein the hydraulic piston device includes a hydraulic piston;
   wherein the control arm comprises a flange that is connected to hydraulic piston; and
   wherein movement of the hydraulic piston causes rotation of the flange and the control arm.

* * * * *